2,801,173

COMPOSITION OF MATTER IN THE NATURE OF DOG FOOD

Garry E. Devareaux, Bethel, Kans.

No Drawing. Application October 26, 1954,
Serial No. 464,898

1 Claim. (Cl. 99—2)

This invention relates to a new and improved composition of matter in the nature of a refreshment or supplement for meat-eating, fur-bearing animals such as small pets, and has for its primary object the provision of a relatively thin, self-sustaining wafer that is not only of high nutritive value but is characterized by its moist, pliable condition and capability of maintaining such condition over a relatively long period of time.

Another important object of the instant invention is to provide a refreshment or treat of the aforementioned character that is particularly novel over compositions heretofore provided for such purpose in that the same is manufactured from certain edible raw ingredients and compressed into thin wafers of the shape and configuration desired, all without the necessity of cooking, thereby facilitating the manufacture and providing a product that will not become stale or rancid even in the absence of refrigeration or packaging in sealed containers.

Still another object of this invention is to provide a wafer composed of a plurality of ingredients of high nutritive value molded and compressed in a thin wafer under high pressures so that the same will maintain its compactness, yet be readily digestible and easily consumed by the animal.

A further object of this invention is to provide a novel method of production utilizing the edible ingredients aforementioned, together with water and glycerine, all molded and compressed at high pressures to provide a finished product that is pliable and moist and, therefore, attractive and palatable to the animal.

While the nature and amounts of the edible raw ingredients selected for the production of the wafer about to be described may be varied considerably within the concepts of the instant invention, the following is suggested because of high nutritive value, capability of admixture, and compression at high pressures into a semi-moist, pliable finished product:

| | Percent |
|---|---|
| Cereal mix | 64.8 |
| Meat and bone scrap | 15.0 |
| Blood meal | 6.0 |
| Ossein concentrate (50%) | 5.0 |
| Sweet mix | 2.0 |
| Bone phosphate | 2.0 |
| Yeast hydrolysate (Yeastamin) | 1.7 |
| Liver and glandular meal | 1.0 |
| Whey by-products | 1.0 |
| Salt | 0.5 |
| Vitamin D3 | (1250 AOAC units per 100 lbs.) |

The above ingredients in the amounts and percentages specified presents a refreshment or treat of high nutritive value of dogs, cats and all other meat-eating, fur-bearing animals. It is in the nature of a supplement and not intended as a primary and sole diet.

While, as above-mentioned, the formula may be varied within certain limits, it is to be preferred that the same be maintained within the following minimum and maximum values:

| | Percent |
|---|---|
| Minimum protein | 24 |
| Minimum fat | 5 |
| Maximum ash | 5 |
| N. F. E. | 60 |

In carrying out the process of producing a satisfactory finished product in the nature of a biscuit or wafer, the above-ingredients are admixed and to each 100 pounds thereof, 5 pounds of water and 5 pounds of glycerine is added thereto.

The entire mixture is thereupon molded under pressure of approximately 14,000 pounds per square inch. The thickness of the mold may vary from one-quarter (¼) inch to as high as one (1) inch, whereupon the relatively thin sheet is die or stamp cut into a plurality of individual wafers or biscuits of desired shape or configuration such as a disc substantially the size of a dollar, the shape of a star, oval or any other form desired.

Flavor may be added such as hamburger flavor, in which event two drops to 1 kilo is suggested.

Noteworthy is the fact that the product is produced in complete absence of cooking and by virtue of the addition of water and glycerine thereto, it remains in a pliable, semi-moist condition over relatively long periods of time.

It is particularly adapted for packages in tubular containers, plastic bags or other containers which may be mounted on display cards or offered to the public through automatic vending machines. In no event is it intended to be a complete food for animals but, by virtue of its characteristic, pliability and absence of dryness, the animal is not likely to refuse the same even when fed continuously as a supplement to his regular diet.

Having thus described the invention what is claimed as new and desired to be secured by Letters Patent is:

The method of preparing a refreshment in the nature of a supplement for meat-eating, fur-bearing animals comprising the steps of admixing approximately 100 parts of solid edible ingredients having high nutritive value, approximately 5 parts of water, and approximately 5 parts of glycerine, all parts being by weight of the total admixture, thereby presenting a moist, cohesive mass; and compressing the mass in a mold at a pressure of approximately 14,000 pounds per square inch to form a relatively thin, self-sustaining wafer that retains its moist and pliable condition over a relatively long period of time.

References Cited in the file of this patent

UNITED STATES PATENTS

| 1,018,415 | Ellis | Feb. 27, 1912 |

FOREIGN PATENTS

| 5,754 | Great Britain | 1902 |

OTHER REFERENCES

Leffingwell et al.: Manufact. Confect., December 1938, pp. 18–20.